(12) United States Patent
Fujie et al.

(10) Patent No.: US 6,432,014 B2
(45) Date of Patent: Aug. 13, 2002

(54) TRACTION DISTRIBUTING APPARATUS FOR MOTOR VEHICLE

(75) Inventors: Toru Fujie; Takashi Tanaka, both of Kanagawa (JP)

(73) Assignee: Unisia Jecs Corporation, Atsugi (JP)

(*) Notice: Subject to any disclaimer, the term of this patent is extended or adjusted under 35 U.S.C. 154(b) by 14 days.

(21) Appl. No.: 09/764,094

(22) Filed: Jan. 19, 2001

(30) Foreign Application Priority Data

Jan. 20, 2000 (JP) ........................................ 2000-011556

(51) Int. Cl.$^7$ .............................................. F16H 48/20
(52) U.S. Cl. ........................................ 475/84; 475/150
(58) Field of Search .............................. 475/18, 27, 84, 475/89, 150; 180/6.44

(56) References Cited

U.S. PATENT DOCUMENTS

| | | | |
|---|---|---|---|
| 4,633,735 A | * 1/1987 | Sakurai et al. | 180/244 |
| 4,867,012 A | * 9/1989 | McGarraugh | 475/106 |
| 5,415,596 A | * 5/1995 | Zulu | 475/18 |
| 5,437,583 A | * 8/1995 | Shibahata et al. | 475/151 |
| 6,328,667 B1 | * 12/2001 | Otaki et al. | 475/84 |

FOREIGN PATENT DOCUMENTS

| | | |
|---|---|---|
| JP | 3-50028 | 3/1991 |
| JP | 10-329572 | 12/1998 |

OTHER PUBLICATIONS

U.S. application No. 08/916,930, Fukushima et al., filed Aug. 22, 1997.

* cited by examiner

*Primary Examiner*—Charles A. Marmor
*Assistant Examiner*—Ankur Parekh
(74) *Attorney, Agent, or Firm*—Foley & Lardner

(57) ABSTRACT

A traction distributing apparatus for a motor vehicle includes a housing, a propeller shaft arranged on the input side of the housing and driven by an engine, and a differential gear mechanism arranged on the output side of the housing for distributing torque from the propeller shaft to axles. A reversible hydraulic motor is arranged on the output side of the housing to provide relative torque between the axles by pressure oil supplied and discharged from the outside. The hydraulic motor comprises a motor casing rotatably arranged on the output side of the housing and a cylinder block rotatably arranged inside the motor casing for rotating relative thereto by means of pressure oil. The motor casing serves as part of one of the axles.

10 Claims, 5 Drawing Sheets

TRACTION DISTRIBUTING APPARATUS FOR MOTOR VEHICLE

BACKGROUND OF THE INVENTION

The present invention relates to a traction distributing apparatus for a motor vehicle which is suitably used to control traction to be distributed to right and left axles, for example, and more particularly, to a traction distributing apparatus using a hydraulic motor for active control for distribution of traction.

In order to improve a cornering performance, etc., motor vehicles such as a four-wheel vehicle are generally provided with a differential gear mechanism arranged between axles of right and left driving wheel and comprising a differential gear, etc. The differential gear mechanism distributes traction derived from an engine to the right and left axles.

However, such traction distributing control ensured by the differential gear mechanism is designed to merely distribute traction of the engine to the right and left axles by using a reaction force which wheels (not shown) receive from the road surface, etc. Thus, when the wheels have a slip on the low-$\mu$ road surface having reduced coefficient of friction due to freezing, for example, stable traction distributing control may be difficult to carry out.

SUMMARY OF THE INVENTION

It is, therefore, an object of the present invention to provide a traction distributing apparatus for a motor vehicle, which is free of the above drawbacks and contributes to enhancement of the workability and the lubrication and assembling performances.

The present invention generally provides a traction distributing apparatus for a motor vehicle with an engine and axles, comprising:
- a housing;
- an input shaft arranged on the input side of said housing and driven by said engine;
- a differential gear mechanism arranged on the output side of said housing for distributing torque from said input shaft to said axles; and
- a reversible hydraulic motor arranged on the output side of said housing, said hydraulic motor providing relative torque between said axles by a pressure oil supplied and discharged from the outside, said hydraulic motor comprising an outer rotor rotatably arranged on the output side of said housing and an inner rotor rotatably arranged inside said outer rotor for rotating relative to said outer rotor by means of said pressure oil, said outer rotor serving as part of one of said axles.

One aspect of the present invention is to provide a traction distributing apparatus for a motor vehicle with an engine and axles, comprising:
- a housing;
- an input shaft arranged on the input side of said housing and driven by said engine;
- a differential gear mechanism arranged on the output side of said housing for distributing torque from said input shaft to said axles;
- a reversible hydraulic motor arranged on the output side of said housing, said hydraulic motor providing relative torque between said axles by a pressure oil supplied and discharged from the outside, said hydraulic motor comprising an outer rotor rotatably arranged on the output side of said housing and an inner rotor rotatably arranged inside said outer rotor for rotating relative to said outer rotor by means of said pressure oil, said outer rotor serving as part of one of said axles; and
- a seal member arranged on the output side of said housing and between said differential gear mechanism and said hydraulic motor, said seal member separating a lubricating oil for said differential gear mechanism from said pressure oil for said hydraulic motor.

The other objects and features of the present invention will become understood from the following description with reference to the accompanying drawings.

DETAILED DESCRIPTION OF THE INVENTION

In order to ensure stable distribution of traction of the engine to the right and left axles, active control is proposed wherein traction corresponding to driver's steering operation is actively distributed to the right and left axles by use of an auxiliary motor such as a hydraulic motor incorporated in the differential gear mechanism.

The above traction distributing apparatus for a motor vehicle comprises a housing, an input shaft arranged on the input side of the housing and driven by an engine, a differential gear mechanism arranged on the output side of the housing and for distributing traction out of the input shaft to right and left axles and comprising a differential gear, etc., and reversible a hydraulic motor arranged on the output side of the housing and for providing relative torque between the right and left axles by pressure oil supplied and discharged to the outside.

When supplied and discharged pressure oil by an outside hydraulic source in accordance with cruising conditions of the vehicle, etc., the hydraulic motor carry out control for distribution of traction for providing relative torque between the right and left axles to enable securing of the cruising stability of the vehicle by actively producing yaw moment therein, for example.

In the above traction distributing apparatus, the right and left axles and the hydraulic motor are separate and distinct components, respectively, so that each axel should be axially arranged through the center of the corresponding hydraulic motor, increasing the number of parts, raising an problem of difficult improvement in workability upon assembling of the apparatus.

Moreover, the axle, arranged through the hydraulic motor, has an axially middle portion inserted into the hydraulic motor, for example, on the side of the inner periphery of a cylinder block or inner rotator, which are coupled by using means such as a spline. The axle has one end placed on the side of the differential gear mechanism and receiving torque out of the input shaft, and another end protruding outwardly of the housing to be coupled with a wheel.

Moreover, the axle should be a shaft having not only long dimension, but robust construction by increasing the diameter due to need of transmitting large torque from the one end on the side of the differential gear mechanism to the another end on the side of the wheel, raising a problem of limited potential for layout in terms of through arrangement of the hydraulic motor.

Furthermore, due to configuration that the axle is arranged through the hydraulic motor, it is difficult to separate lubricating oil for maintaining lubrication of the differential gear mechanism from hydraulic oil for the hydraulic motor. This necessitates the use of part of pressure oil or hydraulic oil supplied and discharged from the hydraulic motor as lubricating oil for the differential gear mechanism, resulting in impossible enhancement of the lubrication performance.

Moreover, in the above traction distributing apparatus, in order to supply and discharge pressure oil from a plurality of cylinders formed in the cylinder block of the hydraulic motor in a successive and switching way, the hydraulic motor includes a different and distinct passage block from the cylinder block and having a plurality of supply/discharge passages for pressure oil. However, the passage block significantly projects to one axial side of the axle, so that the housing of the apparatus is shaped asymmetrically with respect to the input shaft, resulting in limited potential for layout in terms of coupling of the right and left axles with the respective wheels.

Referring to FIGS. 1–5, a traction distributing apparatus for a motor vehicle embodying the present invention will be described in detail.

Figure 1:
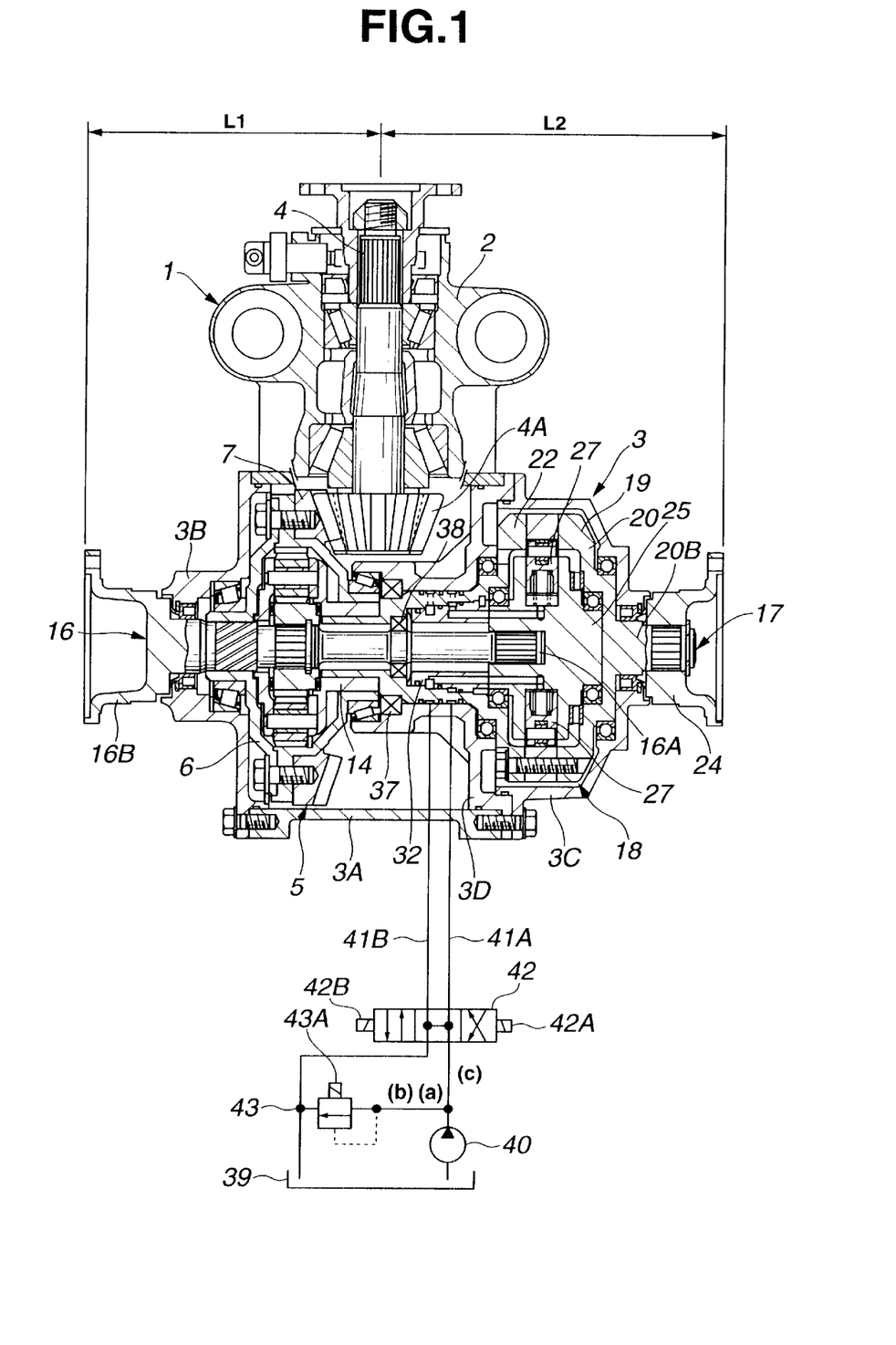
FIG. 1 is a longitudinal section showing a traction distributing apparatus for a motor vehicle embodying the present invention.
Figure 2:
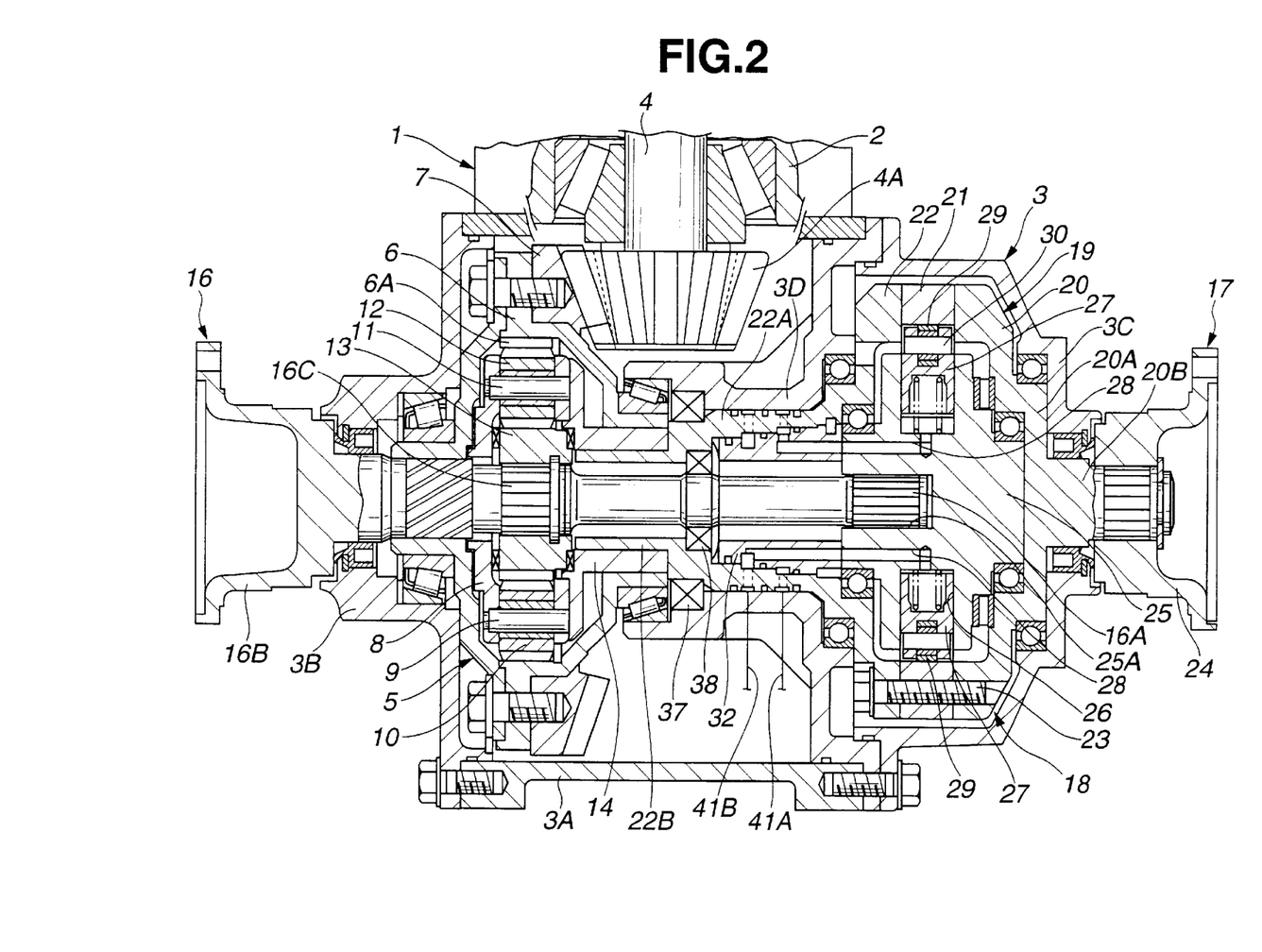
FIG. 2 is an enlarged view showing an output housing in FIG. 1.

Referring mainly to FIG. 1, the traction distributing apparatus comprises a housing 1 including a stepped cylindrical input housing portion 2 positioned on the input side and a stepped cylindrical output housing portion 3 positioned on the output side and integrated with the input housing portion 2 and extending laterally. Referring also to FIG. 2, the output housing portion 3 generally comprises a cylindrical trunk 3A positioned in the center and stepped cylindrical covers 3B, 3C arranged on both sides of the trunk 3A.

Moreover, the output housing portion 3 includes a stepped cylinder 3D arranged inside the trunk 3A and between the covers 3B, 3C. The cylinder 3D axially extends from the cover 3C to the cover 3B, and has an end of reduced diameter to avoid interference with an input gear 4A as described later. A hydraulic motor 18 as described later is rotatably arranged between the cover 3C and the cylinder 3D.

A propeller shaft or input shaft 4 is rotatably arranged in the input housing portion 2 of the housing 1, and is coupled with a crankshaft (not shown) of an engine mounted on a vehicle for rotation. Moreover, the input gear 4A is mounted to an end of the propeller shaft 4 extending into the trunk 3A of the output housing portion 3 to mesh with a ring gear 7 as described later.

A differential gear mechanism 5 is rotatably arranged in the output housing portion 3 to be adjacent to the cover 3B, and comprises a planetary gear set, for example. The ring gear 7, meshed with the input gear 4A, is secured by means of bolts or the like to the outer periphery of the differential casing 6 forming an outer shell of the differential gear mechanism 5. The differential casing 6 is driven by the propeller shaft 4 through the input gear 4A and the ring gear 7, which is transmitted to right and left axles 17, 16 in a distributed way by means of a sun gear 13 and a carrier 8 as described later.

Figure 3:
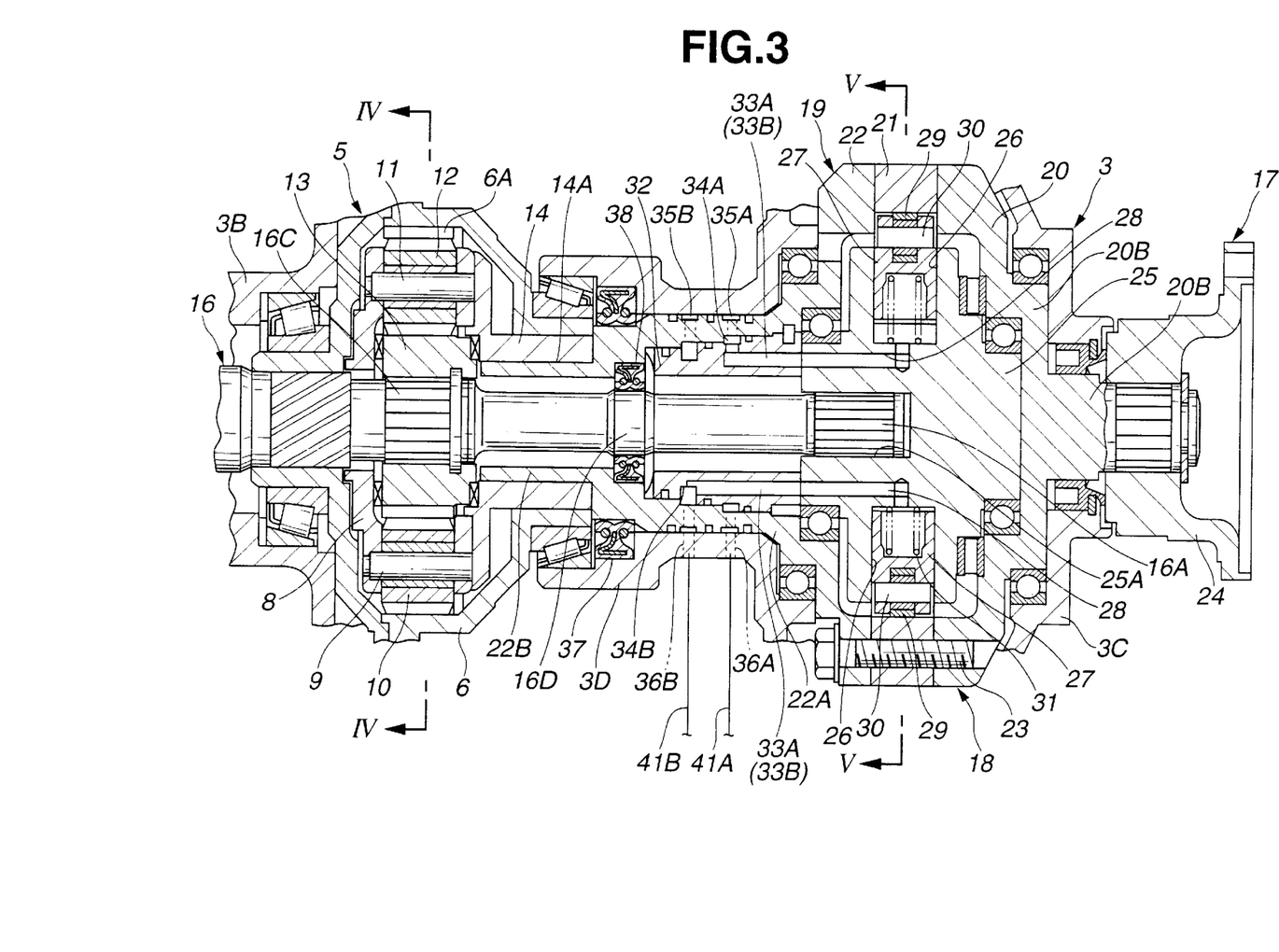
FIG. 3 is a view similar to FIG. 2, showing the primary part the apparatus.
Figure 4:
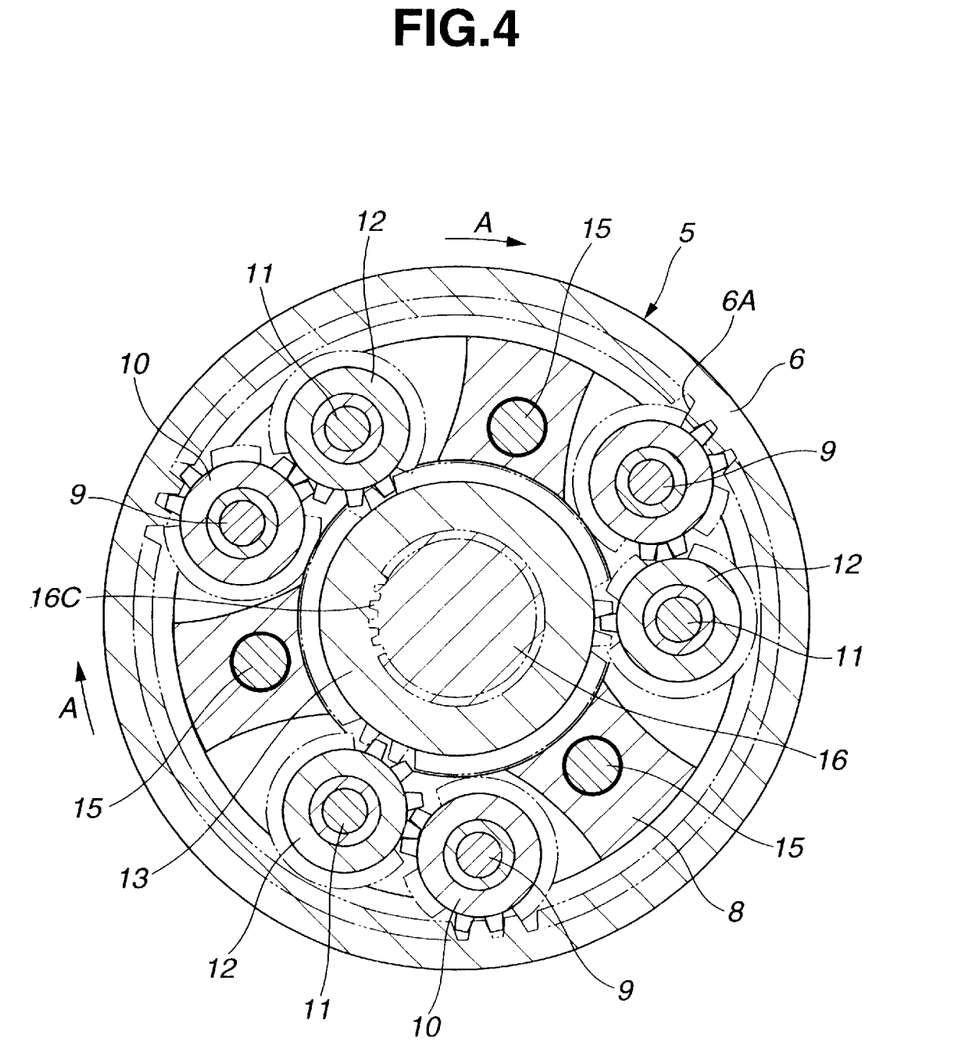
FIG. 4 is a sectional view taken along the line IV—IV in FIG. 3.

Referring to FIGS. 3–4, the differential gear mechanism 5 generally comprises an inner gear 6A circumferentially formed at the inner periphery of the differential casing 6, the carrier 8 relatively rotatably arranged in the differential casing 6, a plurality of planetary gears 10 rotatably supported by the carrier 8 through respective support shafts 9 to be meshed with the inner gear 6A, a plurality of another planetary gears 12 rotatably supported by the carrier 8 through respective support shafts 11 to be meshed with the corresponding planetary gears 10, and the sun gear 13 meshed with the planetary gears 12 to be rotatable relative to the carrier 8.

The sun gear 13 is splined to the axle 16 as described later to rotate together, to which rotation of the differential casing 6, e.g. rotation in the direction of arrow A in FIG. 4, is transmitted through the planetary gears 10, 12 in the same direction of rotation. Moreover, revolution of the planetary gears 10, 12 is transmitted to the carrier 8 through the support shafts 9, 11, thereby rotating the carrier 8 in the same direction as that of the differential casing 6.

During straight-ahead cruising of the vehicle, torque from the differential casing 6 is equally distributed to the sun gear 13 and the carrier 8 through the planetary gears 10, 12, so that the sun gear 13 and the carrier 8 rotate the right and left axles 17, 16 at the same number of revolutions.

During steering operation or cornering of the vehicle, in order that one of the right and left axles 17, 16 may rotate more quickly than another due to a reaction force which the wheels receive from the road surface, etc., torque from the differential casing 6 is transmitted to the sun gear 13 and the carrier 8 at different ratio of rotation. Thus, the inside wheel has relatively low number of revolutions, and the outside wheel has relatively high number of revolutions, achieving the differential function which allows enhancement of the cornering performance of the vehicle, etc.

As shown in FIG. 3, a stepped sleeve 14, which constitutes part of the differential gear mechanism 5, is secured to an end face of the carrier 8 by means of bolts 15 (see FIG. 4) so as to bring rotation of the carrier 8 to the side of a motor casing 19 as described later, i.e. the side of the axle 17. A spline 14A is formed at the inner periphery of the sleeve 14, and is connected to a cylindrical coupling 22B of another side casing 22 as described later.

The right axle 17 comprises the motor casing 19 as described later and a coupling flange 24, and the left axle 16 comprises a single shaft member. One end of the axle 16 inserted into the output housing portion 3 forms a small-diameter spline shank 16A which is coupled with a cylinder block 25 as described later in the center thereof in the detent state.

Moreover, another end of the axle 16 extending outwardly of the housing 3 forms a large-diameter coupling flange 16B. Another spline shank 16C and a circular stepped seal portion 16D are formed in a portion of the axle 16 between the spline shank 16A and the coupling flange 16B. The spline shank 16C is engaged with the inner periphery of the sun gear 13 to rotate together, and serves to transmit rotation of the sun gear 13 to the coupling flange 16B of the axle 16.

Therefore, a portion of the a)de 16 between the coupling flange 16B and the spline shank 16C has a relatively large diameter, providing sufficient rigidity for transmitting great torque to the wheel. On the other hand, a portion of the axle 16 between the spline shank 16C to the spline shank 16A has a relatively small diameter, since it serves to merely transmit relatively small torque produced at the cylinder block 25 of the hydraulic motor 18 as described later. A seal member 38 comes in slide contact with the outer periphery of the stepped seal portion 16D to prevent leakage and mixture of oils as will be described below.

The reversible hydraulic motor 18 is rotatably arranged in the output housing portion 3 on the side of the cover 3C. The hydraulic motor 18 is of the radial-piston type, for example, and comprises the motor casing, the cylinder block 25, a piston 27, and a passage block 32 as described later.

The hydraulic motor 18 is disposed in the output housing portion 3 in the laterally juxtaposed state with respect to the differential gear mechanism 5, and is configured to interpose the passage block 32 between the cylinder block 25 and the differential gear mechanism 5. Through supply and discharge of pressure oil by using a hydraulic pump 40 as described later, the hydraulic motor 18 produces relative rotation of the motor casing 19 and the cylinder block 25 to provide relative torque between the right and left axles 17, 16.

The motor casing 19 is rotatably arranged in the output housing portion 3 to constitute an outer rotor of the hydraulic motor 18. The motor housing 19 is formed as a lidded cylinder as shown in FIGS. 2–3, and comprises a one-side casing 20 having an output shank 20B integrated with a lid 20A in the center thereof, a cam ring 21, and an another-side casing 22. The cam ring 21 is held between the casings 20, 22 by means of bolts 23 (see FIG. 5) for integration.

The entirety of the motor casing 19 comprising the one-side casing 20, the cam ring 21, and the another-side casing 22 is formed as a lidded stepped cylinder extending axially from the cylindrical coupling 22B as described later to the output shank 20B to constitute the right axle 17 together with the coupling flange 24. In this case, the output shank 20B of the one-side casing 20 protrudes outwardly from the cover 3C of the output housing 3 to have an end splined to the coupling flange 24.

Figure 5:
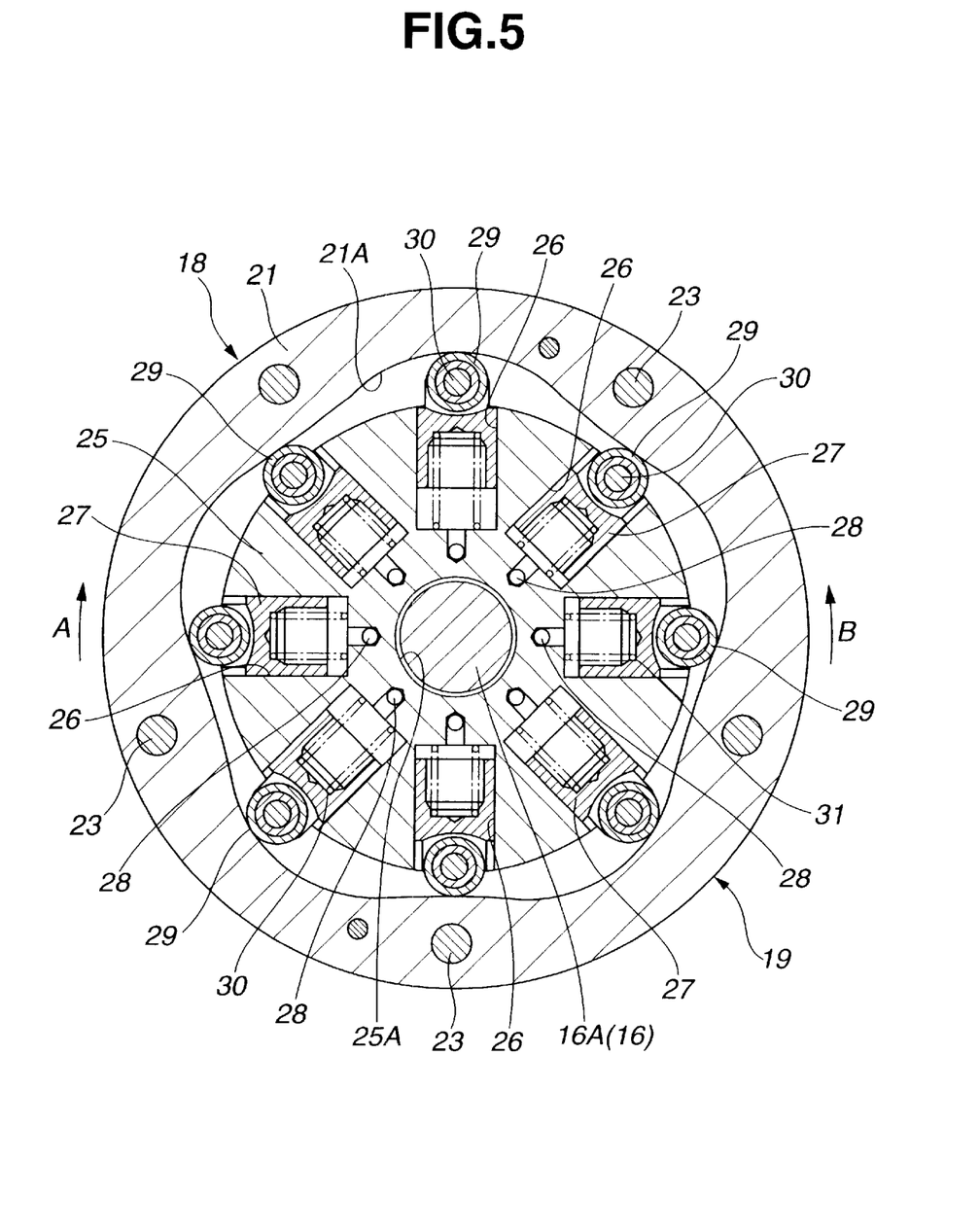
FIG. 5 is a view similar to FIG. 4, taken along the line V—V in FIG. 3.

Referring to FIG. 5, the cam ring 21 of the motor casing 19 has a cam face 21A formed at the inner periphery, which receives torque out of the piston through each roller 29 as described later, generating relative torque between the motor casing 19 and the cylinder block 25 in the direction of arrow A or in the direction of arrow B in FIG. 5.

The another-side casing 22 is formed as a stepped cylinder of roughly two reduced diameters as shown in FIG. 3. The another-side casing 22 holds the cylinder block 25 together with the one-side casing 20, and includes a cylindrical extension 22A extending axially toward the differential gear mechanism 5 and a cylindrical coupling 22B extending from an end of the cylindrical extension 22A to the inner periphery of the sleeve 14. The cylindrical coupling 22B has an outer periphery engaged with the spline 14A of the sleeve 14 from the inside to rotate the motor casing 19, i.e. the axle 17, together with the sleeve 14 of the differential gear mechanism 5.

The cylinder block 25, which constitutes an inner rotor of the hydraulic motor 18, is formed as a rotor of a flattened stepped cylinder, and is rotatably arranged in the motor casing 19 through bearings or the like. Moreover, a bottomed hole 25A is formed in the cylinder block 25 in the center thereof to engage with the spline shank 16A of the axle 16 in the detent state.

As shown in FIG. 5, a plurality of radially extending cylinders 26 is formed in the cylinder block 25 to slidably receive respective pistons 27. Moreover, a plurality of oil passages 28 is formed through the cylinder block 25 to individually communicate with the respective cylinders 26. The oil passages 28 successively communicate with the supply/discharge passages 33A, 33B of the passage block 32 as described later to supply and discharge pressure oil from the cylinders 26. By the force of pressure oil supplied and discharged from the cylinder 26, each piston 27 is reciprocated in the cylinder 26 to generate torque for the hydraulic motor 18.

The rollers 29 are rotatably mounted to a protruding end of the piston 27 through respective support shafts 30, and are biased by respective springs 31 toward the cam face 21A of the cam ring 21. Each spring 31 is disposed between the cylinder 26 and the piston 27 to always bias the piston 27 in the direction of protruding from the cylinder 26. The rollers 29 slide along the cam face 21A of the cam ring 21 to ensure smooth relative rotation of the cylinder block 25 and the cam ring 21, i.e. the motor casing 19.

The passage block 32 serves as a valve member for supplying and discharging pressure oil from each cylinder 26 of the cylinder block 25. The passage block 32 is formed as a stepped cylinder as shown in FIG. 3, and is positioned at the outer periphery of the axle 16 and arranged in the cylindrical extension 22A of the motor casing 19, i.e. the another-side casing 22, in the detent state by means of a knock pin, keyway or the like. The passage block 32 rotates together with the motor casing 19 to relatively rotatably hold the cylinder block 25 between the passage block and the lid 20A of the one-side casing 20.

The supply/discharge passages 33A, 33B are circumferentially formed through the passage block 32 at regular intervals, and are alternately disposed on an imaginary circle which is concentric with the axle 16. An end face of the passage block 32 coming in slide contact with an end face of the cylinder block 25 forms a change-over valve for alternately ensuring communication of the supply/discharge passages 33A, 33B with the oil passages 28.

Annular oil grooves 34A, 34B are formed at the outer periphery of the passage block 32 to individually communicate with the supply/discharge passages 33A, 33B. The annular oil grooves 34A, 34B are disposed away from each other in the axial direction of the passage block 32. The annular oil grooves 34A, 34B communicate with oil holes 35A, 35B formed in the cylindrical extension 22A of the another-side casing 22 and supply/discharge ports 36A, 36B formed in the stepped cylinder 3D of the output housing portion 3 to bring pressure oil out of the supply/discharge ports 36A, 36B to the supply/discharge passages 33A, 33B.

A seal member 37 is arranged between the stepped cylinder 3D of the output housing portion 3 and the motor casing 19 of the hydraulic motor 18. As shown in FIG. 3, the seal member 37 comprises a double lip seal, etc., and is interposed between the cylindrical extension 22A of the another-side casing 22 and the stepped cylinder 3D with some interference. The seal member 37 serves to separate lubricating oil for the differential gear mechanism 5 from pressure oil or hydraulic oil for the hydraulic motor 18, for example, between the output housing portion 3 and the motor casing 19 to prevent leakage and mixture of those oils.

The seal member 38 is arranged between the stepped seal portion 16D. The seal member 38 also comprises a double lip seal, etc., and is interposed between the cylindrical extension 22A of the another-side casing 22 and the seal stepped portion 16D with some interference. The seal member 38 serves to separate lubricating oil for the differential gear mechanism 5 from pressure oil or hydraulic oil for the hydraulic motor 18, for example, between the axle 16 and the motor casing 19 to prevent leakage and mixture of those oils.

A reservoir 39 for storing hydraulic oil and the hydraulic pump 40 constitute a hydraulic source. The hydraulic pump 40 is driven by the propeller shaft 4, etc. as shown in FIG. 1 to supply and discharge hydraulic oil or pressure oil within the reservoir 39 from conduits 41A, 41B. Ends of the conduits 41A, 41B are connected to the supply/discharge ports 36A, 36B formed in the stepped cylinder 3D of the output housing portion 3 as shown in FIGS. 2–3.

A directional control valve 42, arranged in the middle of the conduits 41A, 41B, comprises a four-port three-position electromagnetic directional control valve, for example, and constitutes switch means for switching the direction of pressure oil to be supplied and discharged from the hydraulic motor 18. The directional control valve 42 includes solenoids 42A, 42B disposed on both sides, which input control signals from an outside control unit (not shown).

With this, the directional control valve 42 is switched from a neutral position (a) to a right switched position (c) or a left switched position (b) wherein switching is carried out for the direction of pressure oil to be supplied and discharged from the hydraulic motor 18. When retained in the neutral position (a), the directional control valve 42 stops supply and discharge of pressure oil to substantially stop the hydraulic motor 18, making rotation output ineffective.

A pressure variable relief valve 43 constitutes hydraulic control means for variably controlling the discharge pressure, i.e. the pressure of pressure oil, of the hydraulic pump 40. The relief valve 43 includes a pressure adjusting solenoid 43A to variably control a set value of the relief pressure in accordance with a current value or a pulse duty, etc. of a control signal which the control unit provides to the solenoid 43A.

Next, operation of the traction control apparatus for a motor vehicle will be described.

When driving the engine of the vehicle, rotation output thereof is transmitted to the differential casing 6 of the differential gear mechanism 5 through the propeller shaft 4. Rotation of the differential casing 6, e.g. rotation in the direction of arrow A in FIG. 4, is transmitted to the sun gear 13 through the planetary gears 10, 12 in the same direction of rotation. Moreover, revolution of the planetary gears 10, 12 is transmitted to the carrier 8 of the differential gear mechanism 5 through the support shafts 9, 11, thereby rotating the carrier 8 in the same direction as that of the differential casing 6.

During straight-ahead cruising of the vehicle, torque from the differential casing 6 is equally distributed to the sun gear 13 and the carrier 8 through the planetary gears 10, 12, so that the sun gear 13 and the carrier 8 rotate the right and left axles 17, 16 at the same number of revolutions.

During steering operation or cornering of the vehicle, in order that one of the right and left axles 17, 16 may rotate more quickly than another due to a reaction force which the wheels receive from the road surface, etc., torque from the differential casing 6 is transmitted to the sun gear 13 and the carrier 8 at different ratio of rotation. Thus, the inside wheel has relatively low number of revolutions, and the outside wheel has relatively high number of revolutions, enabling enhancement of the cornering performance of the vehicle, etc.

Such traction distributing control for the right and left axles 17, 16 ensured by the differential gear mechanism 5 depends on a reaction force which the wheels receive from the road surface, etc., so that upon occurrence of slippage, for example, the control may provide no traction distributing function, resulting in impossible improvement in the cruising stability of the vehicle.

In such case, the control unit provides control signals to the directional control valve 42 and the relief valve 43 in accordance with detected signals from various sensors (not shown) for detecting cruising conditions of the vehicle. With this, the directional control valve 42 is switched from the neutral position (a) to the switched position (b) to supply and discharge pressure oil of the hydraulic pump 40 through the conduits 41A, 41B and from the hydraulic motor 3 in the output housing portion 3.

In the hydraulic motor 3 in the output housing portion 3, when supplying and discharging pressure oil from the cylinders 26 in the cylinder block 25 through the supply/discharge passages 33A, 33B of the passage block 32, the oil passages 28, etc., the pistons 27 are reciprocated in the respective cylinders 26, thereby producing relative rotation of the motor casing 19 and the cylinder block 25.

As a result, torque due to relative rotation of the motor casing 19 and the cylinder block 25 is provided to the right and left axles 17, 16 in the directions opposite to each other, so that torque transmitted from the propeller shaft 4 to the differential gear mechanism 5 is actively distributed to the right and left axles 17, 16 by means of torque of the hydraulic motor 18. This distribution of traction enables active generation of yaw moment in the vehicle, for example, resulting in possible securing of the cruising stability of the vehicle.

In the illustrative embodiment, one or right axle 17 is comprised of the motor casing 9 of the hydraulic motor 18 and the coupling flange 24. The another-side casing 22 of the motor casing 19 is splined to the sleeve 14 of the differential gear mechanism 5 at the position of the cylindrical coupling 22B. And the output shank 20B integrated with the lid 20A of the one-side casing 20 is splined to the coupling flange 24 at the outside position of the output housing portion 3.

Thus, the motor casing 19 as an outer rotor of the hydraulic motor 18 can serve as part of the axle 17 also, eliminating need of a different long axle from the hydraulic motor as in the earlier art. This enables a reduction in the number of parts of the apparatus, resulting in possible improvement in the workability upon assembling.

Moreover, the motor casing 19 of the hydraulic motor 18 can serve as part of the axle 17, so that, in the cylinder block 25 or an inner rotor of the hydraulic motor 18, the engagement hole 25A does not need to be formed as an axial through hole, for example, but only needs to allow engagement with the end or the small-diameter spline shank 16A of the axle 16 in the detent state, for example.

Thus, the cylinder block 25 of the hydraulic motor 18 can be formed to have relatively small outer diameter, enabling a reduction in outer diameter of the motor casing 19. This enables the hydraulic motor 18 to be received in the output housing portion 3 without being bulky, resulting in a reduction in size and weight of the whole apparatus.

Moreover, the axle 16 has a relatively large-diameter portion between the coupling flange 16B and the spline shank 16C, providing sufficient rigidity for transmitting great torque to the wheel. And a portion of the axle 16 between the spline shank 16C and the spline shank 16A has a relatively small diameter, since it serves to merely transmit relatively small torque produced at the cylinder block 25 of the hydraulic motor 18. This eliminates need of the axle 16 formed as a shaft of long dimension and robust construction with large diameter.

Moreover, the motor casing 19 is formed as a lidded stepped cylinder to serve as part of the axle 17, and the passage block 32 is received in the another-side casing 22 of the motor casing 19 and between the cylinder block 25 and the differential gear mechanism 5. This configuration allows dimensions of protrusion L2, L1 of the right and left axles 17, 16 with respect to the center of the propeller shaft 4 to be roughly equal to each other as shown in FIG. 1.

As a result, the output housing portion 3 can be formed roughly symmetrically with respect to the input housing portion 2 or the propeller shaft 4, achieving coupling of the right and left axles 17, 16 with the respective wheels with high flexibility. This removes a problem of limited potential for layout when mounting the traction distributing apparatus on the vehicle, etc. as in the earlier art.

Furthermore, the motor casing 19 of the hydraulic motor 18 serves as part of the axle 17, and the cylinder block 25 does not need to have an axial through hole or the like, so that the use of two seal members 37, 38 can easily separate lubricating oil for the differential gear mechanism 5 from the hydraulic oil for the hydraulic motor 18, preventing leakage and mixture of those oils satisfactorily.

This eliminates need of using part of pressure oil or hydraulic oil to be supplied and discharged from the hydraulic motor 18 as lubricating oil for the differential gear mechanism 5 as in the earlier art. And special gear oil or the like can be used as lubricating oil for the differential gear mechanism 5, obtaining enhanced lubrication performance. Also, special oil can be used as hydraulic oil for the hydraulic motor 18, obtaining elongated life and improved maintenance performance.

Therefore, in the illustrative embodiment, since the motor casing 19 of the hydraulic motor 18 serves as part of the axle 17, there is no need to use a shaft of long dimension and robust construction with large diameter required in the earlier art, enabling a reduction in the number of parts of the apparatus, resulting in possible improvement in the workability upon assembling. Moreover, the separation of lubricating oil for the differential gear mechanism 5 can satisfactorily be obtained from the hydraulic oil for the hydraulic motor 18, increasing the lubrication performance.

Moreover, since the dimensions of protrusion L2, L1 of the right and left axles 17, 16 can roughly equally be set with respect to the propeller shaft 4, the flexibility of layout can be increased in terms of coupling of the right and left axles 17, 16 with the respective wheels, improving the assembling performance of the apparatus.

Having described the present invention with regard to the preferred embodiment, it is understood that the present invention is not limited thereto, and various modifications and changes can be made without departing from the scope of the present invention. By way example, in the embodiment, the hydraulic motor 18 is of the radial-piston type, alternatively, different types of hydraulic motors may be adopted such as a swash-plate hydraulic motor, trochoidal hydraulic motor, etc.

Moreover, in the embodiment, the differential gear mechanism 5 comprises a planetary gear 10, 12, etc., optionally, it may comprise a bevel gear, etc. as described, for example, in JP-A 3-50028 and U.S. patent application Ser. No. 08/916,930.

The entire teachings of Japanese Patent Application 2000-011556 are incorporated hereby by reference.

What is claimed is:

1. A traction distributing apparatus for a motor vehicle with an engine and axles, comprising:
    a housing;
    an input shaft arranged on the input side of said housing and driven by said engine;
    a differential gear mechanism arranged on the output side of said housing for distributing torque from said input shaft to said axles; and
    a reversible hydraulic motor arranged on the output side of said housing, said hydraulic motor providing relative torque between said axles by a pressure oil supplied and discharged from the outside, said hydraulic motor comprising an outer rotor rotatably arranged on the output side of said housing and an inner rotor rotatably arranged inside said outer rotor for rotating relative to said outer rotor by means of said pressure oil, said outer rotor serving as part of one of said axles.

2. The traction distributing apparatus as claimed in claim 1, wherein said another of said axles is coupled with said inner rotor of said hydraulic motor to be able to rotate together.

3. The traction distributing apparatus as claimed in claim 2, wherein said differential gear mechanism and said hydraulic motor are laterally juxtaposed on the output side of said housing and with respect to said input shaft.

4. The traction distributing apparatus as claimed in claim 3, wherein said outer rotor of said hydraulic motor comprises a passage block interposed between said differential gear mechanism and said inner rotor of said hydraulic motor and having a supply/discharge passage for allowing flow of said pressure oil between said housing and said inner rotor.

5. The traction distributing apparatus as claimed in claim 4, wherein said outer rotor of said hydraulic motor comprises a motor casing including a stepped cylinder with a lid and an output shank which is integrated with the center of said lid and constitutes part of said one of said axles.

6. The traction distributing apparatus as claimed in claim 5, wherein said inner rotor of said hydraulic motor comprises a cylinder block having a plurality of cylinders for said pressure oil and driven in said motor casing by means of pistons received in said respective cylinders.

7. The traction distributing apparatus as claimed in claim 6, wherein said motor casing comprises a cylindrical extension arranged opposite to said lid with respect to said cylinder block and extending toward said differential gear mechanism.

8. The traction distributing apparatus as claimed in claim 7, wherein said passage block of said hydraulic motor is arranged in said extension in the detent state so as to supply and discharge said pressure oil from said plurality of cylinders of said cylinder block in a successive and switching way.

9. The traction distributing apparatus as claimed in claim 8, further comprising a seal member arranged on the output side of said housing and between said differential gear mechanism and said hydraulic motor, said seal member separating a lubricating oil for said differential gear mechanism from said pressure oil for said hydraulic motor.

10. A traction distributing apparatus for a motor vehicle with an engine and axles, comprising:

a housing;

an input shaft arranged on the input side of said housing and driven by said engine;

a differential gear mechanism arranged on the output side of said housing for distributing torque from said input shaft to said axles;

a reversible hydraulic motor arranged on the output side of said housing, said hydraulic motor providing relative torque between said axles by a pressure oil supplied and discharged from the outside, said hydraulic motor comprising an outer rotor rotatably arranged on the output side of said housing and an inner rotor rotatably arranged inside said outer rotor for rotating relative to said outer rotor by means of said pressure oil, said outer rotor serving as part of one of said axles; and a seal member arranged on the output side of said housing and between said differential gear mechanism and said hydraulic motor, said seal member separating a lubricating oil for said differential gear mechanism from said pressure oil for said hydraulic motor.

\* \* \* \* \*